United States Patent
Kang et al.

(10) Patent No.: US 11,666,887 B2
(45) Date of Patent: Jun. 6, 2023

(54) HYDROCARBON ADSORBENT

(71) Applicants: HYUNDAI MOTOR COMPANY, Seoul (KR); KIA CORPORATION, Seoul (KR); KOREA UNIVERSITY RESEARCH AND BUSINESS FOUNDATION, Seoul (KR)

(72) Inventors: Chun Yong Kang, Yongin-si (KR); Chang Hwan Kim, Seongnam-si (KR); Jungkyu Choi, Seoul (KR); Eun-Hee Jang, Seoul (KR); Jin Seong Kim, Seoul (KR); Hwiyoon Noh, Seoul (KR); La Young Choi, Seoul (KR)

(73) Assignees: HYUNDAI MOTOR COMPANY, Seoul (KR); KIA CORPORATION, Seoul (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 1 day.

(21) Appl. No.: 17/360,418

(22) Filed: Jun. 28, 2021

(65) Prior Publication Data
US 2022/0152577 A1    May 19, 2022

(30) Foreign Application Priority Data

Nov. 16, 2020  (KR) .......... 10-2020-0152736

(51) Int. Cl.
*B01J 20/18*    (2006.01)
*B01J 20/02*    (2006.01)
*B01J 20/28*    (2006.01)
*B01J 20/32*    (2006.01)
*B01J 20/30*    (2006.01)

(52) U.S. Cl.
CPC ......... *B01J 20/186* (2013.01); *B01J 20/0207* (2013.01); *B01J 20/28011* (2013.01); *B01J 20/28016* (2013.01); *B01J 20/28083* (2013.01); *B01J 20/3078* (2013.01); *B01J 20/3293* (2013.01); *B01J 2220/42* (2013.01)

(58) Field of Classification Search
CPC ...... B01J 20/18; B01J 20/186; B01J 20/0207; B01J 20/28011; B01J 20/28016; B01J 20/28083; B01J 20/3078; B01J 20/3293; B01J 2220/42
USPC .......................................... 502/73
See application file for complete search history.

(56) References Cited

U.S. PATENT DOCUMENTS

2017/0122875 A1\* 5/2017 Fondeur .......... B01J 20/12
2019/0126247 A1   5/2019 Deeba

FOREIGN PATENT DOCUMENTS

KR    2018-0114553 A    10/2018

\* cited by examiner

*Primary Examiner* — Edward M Johnson
(74) *Attorney, Agent, or Firm* — McDonnell Boehnen Hulbert & Berghoff LLP (57) ABSTRACT

A hydrocarbon adsorbent includes a core-shell particle including a core and a shell surrounding the core, wherein the core includes ion-exchanged zeolite that is ion-exchanged with a metal other than silicon (Si) and aluminum (Al) and the shell includes a mesoporous metal oxide.

6 Claims, 6 Drawing Sheets

HYDROCARBON ADSORBENT

CROSS REFERENCE TO RELATED APPLICATIONS

This application claims priority to and the benefit of Korean Patent Application No. 10-2020-0152736 filed in the Korean Intellectual Property Office on Nov. 16, 2020, the entire contents of which are incorporated herein by reference.

BACKGROUND

(a) Field

The present disclosure relates to a hydrocarbon adsorbent having a core-shell structure and a method for preparing the same.

(b) Description of the Related Art

An exhaust gas of a gasoline vehicle is purified by a three-way catalyst, and when a temperature of the catalyst is greater than or equal to 400° C., a purification performance of nearly 100% may be obtained. However, in the cold-start section immediately after engine start, the three-way catalyst does not operate normally, so the exhaust gas is not purified and is discharged into the atmosphere. In particular, it is known that about 70% of the total EM is emitted from the cold-start section of hydrocarbon (HC).

As an approach against these problems, a zeolite-based hydrocarbon adsorbent (HC trap) is introduced into the exhaust gas system, the hydrocarbon adsorbent temporarily adsorbs the hydrocarbons discharged from the cold-start section until the three-way catalyst warm-up is completed, and then it is purified through a three-way catalyst when desorbed from a hydrocarbon adsorbent at the end of the three-way catalyst warm-up.

In most studies reported to date, zeolite-based hydrocarbon adsorbents have insufficient high-temperature heat resistance, and their structure collapses above 850° C. Therefore, only the method of installing and using it on the underfloor has been examined. However, in the underfloor, a warm-up rate of the three-way catalyst is slow, so it is difficult to apply the hydrocarbon adsorbent technology because a hydrocarbon slip occurs from the hydrocarbon adsorbent before activation of the three-way catalyst.

SUMMARY

An objective of the present disclosure is to provide a hydrocarbon adsorbent having improved hydrothermal stability while having a high adsorption amount of unsaturated hydrocarbons, thereby resolving the problem of deteriorated durability that resulted from structural collapse and active site loss in a high-temperature humid environment.

Another objective of the present disclosure is to provide a method for preparing the hydrocarbon adsorbent.

According to an embodiment of the present disclosure, a hydrocarbon adsorbent includes a core-shell particle including a core and a shell surrounding the core, wherein the core includes ion-exchanged zeolite that is ion-exchanged with a metal other than silicon (Si) and aluminum (Al) and the shell includes a mesoporous metal oxide.

The zeolite may have a Si/Al mole ratio of about 10 to about 200.

The zeolite may be ion-exchanged with a metal including Cr, Fe, Co, Ti, W, Ir, Pt, Rd, Pd, Ru, Th, Ni, Cu, V, Au, Re, Zr, Mo, or a combination thereof.

The mesoporous metal oxide may have a pore size of about 2 nm to about 10 nm.

The mesoporous metal oxide may include $CeO_2$, $ZrO_2$, $Al_2O_3$, or a combination thereof.

The metal of the mesoporous metal oxide may be included in an amount of about 0.1 wt % to about 7 wt % based on a total weight of the core-shell particle.

According to another embodiment of the present disclosure, a method of preparing a hydrocarbon adsorbent includes preparing a core including zeolite, and forming a shell including a mesoporous metal oxide to prepare a core-shell particle, wherein the method further includes ion-exchanging the zeolite with a metal other than silicon (Si) and aluminum (Al).

The preparing of the core-shell particle may be performed by mixing a core-containing solution and a metal oxide precursor-containing solution, and reacting them at about 100° C. to about 200° C. for about 12 hours to about 24 hours.

The preparing of the core-shell particle may further include drying the reaction product at about 70° C. to about 150° C. for about 10 hours to about 24 hours, and then calcining it at about 400° C. to about 700° C. for about 1 hour to about 24 hours.

The core-containing solution may further include glucose, fructose, galactose, sucrose, maltose, or a combination thereof.

The metal oxide precursor-containing solution may further include urea, ammonia, sodium carbonate, sodium hydrogen carbonate, potassium carbonate, potassium hydrogen carbonate, sodium acetate, potassium acetate, diethanol amine, trimethylamine, hexamethylene diamine, tetramethylammonium hydroxide, or a combination thereof.

In the ion-exchanging of the zeolite with the metal, a wet impregnation method in which the core or the core-shell particle is added to the metal-containing solution to impregnate the metal into the zeolite may be used.

The method may further include drying the metal-impregnated core or core-shell particle at about 70° C. to about 150° C. for about 10 hours to about 24 hours, and then calcining the resultant at about 400° C. to about 700° C. for about 1 hour to about 24 hours.

The hydrocarbon adsorbent of the present disclosure improves hydrothermal stability while having a high adsorption amount of unsaturated hydrocarbons, thereby resolving the problem of deteriorated durability that resulted from structural collapse and active site loss in a high-temperature humid environment.

DETAILED DESCRIPTION

The advantages and features of the present disclosure and the methods for accomplishing the same will be apparent from the embodiments described hereinafter with reference to the accompanying drawings. However, an implemented form may not be limited to exemplary embodiments disclosed below. Unless otherwise defined, all terms (including technical and scientific terms) used herein have the same meaning as commonly understood by one of ordinary skill in the art. In addition, terms defined in a commonly used dictionary are not to be ideally or excessively interpreted unless explicitly defined.

In addition, unless explicitly described to the contrary, the word "comprise", and variations such as "comprises" or "comprising," will be understood to imply the inclusion of stated elements but not the exclusion of any other elements.

Further, the singular includes the plural unless mentioned otherwise.

The hydrocarbon adsorbent according to an embodiment of the present disclosure includes core-shell particles including a core and a shell surrounding the core. The hydrocarbon adsorbent may include a plurality of core-shell particles.

Figure 1:
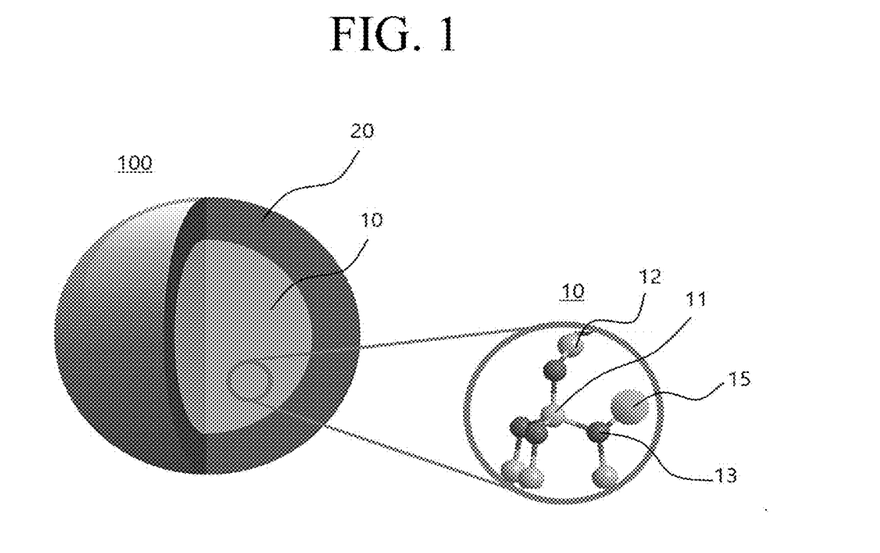
FIG. 1 is a schematic view showing a hydrocarbon adsorbent according to an embodiment of the present disclosure.

FIG. 1 is a schematic view showing the hydrocarbon adsorbent. Hereinafter, the hydrocarbon adsorbent will be described with reference to FIG. 1.

Referring to FIG. 1, the hydrocarbon adsorbent includes core-shell particles 100 including the core 10 and a shell 20 surrounding the core 10.

The core 10 may include synthetic or natural zeolite particles, and for example, Y-type zeolite (FAU), MFI-type zeolite, mordenite-type zeolite, beta-type zeolite (BEA), A-type zeolite, X-type zeolite, L-type zeolite, CHA zeolite and ZSM-5 may be used. In FIG. 1, as an example of the core 10, a zeolite composed of an aluminum atom 11, a silicon atom 12, and an oxygen atom 13 is shown, but the present disclosure is not limited thereto. The zeolite may have a Si/Al mole ratio of about 10 to about 200, for example, about 10 to about 70. When the Si/Al mole ratio of the zeolite exceeds about 200, adsorption efficiency of unsaturated hydrocarbons may be lowered.

The zeolite may be ion-exchanged with a metal other than silicon (Si) and aluminum (Al), and may be ion-exchanged with a metal including, for example, Cr, Fe, Co, Ti, W, Ir, Pt, Rd, Pd, Ru, Th, Ni, Cu, V, Au, Re, Zr, Mo, or a combination thereof. The metal may be included in an amount of about 1 wt % to about 10 wt % based on a total weight of the core-shell particle 100. When the content of the metal is less than about 1 wt %, adsorption performance of the unsaturated hydrocarbon may be deteriorated, and when it exceeds about 10 wt %, hydrothermal stability may decrease.

On the other hand, the zeolite with a large amount of aluminum (Al) has a higher adsorption amount of unsaturated hydrocarbons than that of a zeolite with a small or no aluminum content, but there is a problem that it collapses in a high-temperature environment with water ($H_2O$). Since water ($H_2O$) is included in the actual exhaust gas, it is necessary to prevent the contact of water with the zeolite including aluminum in order to use the zeolite in this environment.

Accordingly, the hydrocarbon adsorbent includes a shell 20 including mesoporous metal oxide. The shell 20 surrounds the core 10 with the mesoporous metal oxide and thus improves hydrothermal stability and accordingly, may resolve the problem of deteriorated durability that resulted from structural collapses and active site loss in a high-temperature humid environment.

When the metal oxide is mesoporous metal oxide including meso-sized pores, the hydrothermal stability may be much improved. The pore size may be about 2 nm to about 10 nm, for example, about 2 nm to about 6 nm.

The mesoporous metal oxide may include $CeO_2$, $ZrO_2$, $Al_2O_3$, or a combination thereof, and may be, for example, $CeO_2$. When the mesoporous metal oxide includes $CeO_2$, hydrothermal stability may be further improved.

The metal of the mesoporous metal oxide may be included in an amount of about 0.1 wt % to about 7 wt %, for example about 0.1 wt % to about 4 wt % based on a total weight of the core-shell particle 100. When the content of the metal of the mesoporous metal oxide is less than about 0.1 wt %, hydrothermal stability may be deteriorated, and when it exceeds about 7 wt %, performance may be deteriorated after hydrothermal deterioration.

A method of preparing a hydrocarbon adsorbent according to another embodiment of the present disclosure includes preparing a core including zeolite, and forming a shell including a mesoporous metal oxide to prepare a core-shell particle.

The zeolite may be purchased commercially or prepared by a known method. For example, the zeolite may be prepared as follows: a hydrothermal synthesis of a raw material mixture including silica sources such as silica, silica sol, and sodium silicate, alumina sources such as alumina gel, alumina sol, and sodium aluminate, alkali sources such as sodium hydroxide and sodium silicate, water, and, if necessary, organic base such as amines is performed to prepare an alkali metal type zeolite, and then the alkali metal type zeolite is ion-exchanged to prepare a proton (H) type zeolite. In addition, the proton type zeolite may be prepared by treating the alkali metal-type zeolite prepared in the hydrothermal synthesis method with an ammonium chloride or ammonium nitrate aqueous solution and the like to prepare ammonium type zeolite and then, calcining the ammonium type zeolite at about 400° C. to about 700° C.

On the surface of the core including the zeolite, a shell including the mesoporous metal oxide is formed to prepare a core-shell particle.

Specifically, the core-shell particle may be prepared by mixing a core-containing solution and a metal oxide precursor-containing solution and reacting them.

The core-containing solution may be prepared by adding the obtained zeolite to a solvent, and at this time, a cyclic hydrocarbon including a large number of hydroxyl groups (OH) that can be easily soluble in water, for example, glucose, fructose, galactose, sucrose, maltose, or a combination thereof may be further added. The glucose or the like may help to form mesopores of the shell, and may help uniform shell synthesis.

In addition, the metal oxide precursor-containing solution may contain a weakly basic substance that is well soluble in water, for example, urea, ammonia, sodium carbonate, sodium bicarbonate, potassium carbonate, potassium hydrogen carbonate, sodium acetate, potassium acetate, diethanol amine, trimethylamine, hexamethylene diamine, tetramethylammonium hydroxide, or a combination thereof.

The metal oxide precursor-containing solution may be prepared by adding the metal oxide precursor to a solvent. The precursor of the metal oxide may be a nitrate, hydrate, chloride, or sulfate including Ce, Zr, Al, or a combination thereof. For example, when the metal oxide is $CeO_2$, the metal oxide precursor may be cerium nitrate (III) ($Ce(NO_3)_3$). At this time, urea or the like may be further added. The urea may make the metal oxide precursor-containing solution be basic, thereby helping deprotonation of glucose so that a uniform shell may be synthesized.

The solvent may include distilled water, deionized water, ethanol, methanol, ethylene glycol, propylene glycol, isopropyl alcohol, or a combination thereof.

The reaction may be performed at about 100° C. to about 200° C. for about 12 hours to about 24 hours, for example, at about 140° C. to about 170° C. for about 18 hours to about 24 hours.

The preparing of the core-shell particles may further include drying the reaction product at about 70° C. to about 150° C. for about 10 hours to about 24 hours, and then calcining it at about 400° C. to about 700° C. for about 1 hour to about 24 hours.

On the other hand, the method of preparing the hydrocarbon adsorbent may further include ion-exchanging the zeolite with a metal other than silicon (Si) and aluminum (Al). The ion-exchanging may be performed before and after forming the shell. However, when the ion-exchanging is performed before forming the shell, the mesoporous metal oxide shell may suppress sintering of the metal ions and thus much improve the hydrothermal stability of the hydrocarbon adsorbent.

Specifically, the ion-exchanging of the zeolite with the metal may use a wet impregnation method in which the core or the core-shell particle is added to the metal-containing solution to impregnate the metal into the zeolite.

The metal-containing solution may be prepared by adding the metal precursor to a solvent. The precursor of the metal oxide may be nitrate, hydrate, chloride, sulfate, and the like including Cr, Fe, Co, Ti, W, Ir, Pt, Rd, Pd, Ru, Th, Ni, Cu, V, Au, Re, Zr, Mo, or a combination thereof. For example, when the metal is Cu, the metal oxide precursor may be copper (II) nitrate ($Cu(NO_3)_2$).

The solvent may include distilled water, deionized water, ethanol, methanol, ethylene glycol, propylene glycol, isopropyl alcohol, or a combination thereof.

The ion-exchanging with the metal may further include drying the zeolite that is ion-exchanged with the metal at about 70° C. to about 150° C. for about 10 hours to about 24 hours, and then calcining it at about 400° C. to about 700° C. for about 1 hour to about 24 hours.

The hydrocarbon adsorbent may be used for adsorbing hydrocarbons in an automobile exhaust gas system, and in particular, may be used for adsorbing hydrocarbons discharged from the cold-start section until the completion of warm-up of the three-way catalyst.

The hydrocarbon may include propene, toluene, ethane, ethene, propane, benzene, xylene, ethylene, 2-methylbutane, formaldehyde, styrene, acetaldehyde, or a combination thereof.

Hereinafter, specific examples of the disclosure are described. However, the examples described below are for illustrative purposes only, and the scope of the disclosure is not limited thereto.

Preparation Example: Preparation of Hydrocarbon Adsorbent

Example 1

1) Metal Ion-Exchange Step

Copper nitrate trihydrate ($Cu(NO_3)_2 \cdot 3H_2O$, 98%, Sigma-Aldrich Co., Ltd.) was dissolved in deionized water to prepare a copper nitrate II ($Cu(NO_3)_2$) solution. H-type zeolite particles were added to the copper nitrate solution, and finally, 5 wt % of Cu was impregnated thereinto. The mixture was put in a rotary evaporator to all remove moisture therefrom, and Cu-impregnated zeolite was recovered, dried at 100° C. for 3 hours, and calcined at 550° C. for 6 hours under air flow of 200 mL/min by increasing a temperature at 1° C./min.

2) Preparation of Core-Shell Particles

H-type ZSM-5 zeolite in which Cu was impregnated using a wet impregnation method was added and then, mixed with deionized water in which glucose was dissolved (Beaker A). Subsequently, cerium nitrate III ($Ce(NO_3)_3$) was dissolved in deionized water in which urea was dissolved (Beaker B). The solution in the beaker B was poured into the beaker A and then, mixed with the solution therein. The final mixture was put in a Teflon (tetrafluoroethylene)-lined autoclave and reacted in a 160° C. oven for 20 hours. Then, a resulting material therefrom was recovered and then, dried at 100° C. for 12 hours and calcined 550° C. for 12 hours under air flow of 200 mL/min to 300 mL/min at by increasing the temperature at 1° C./min.

Herein, the core-shell particle included 5 wt % of Cu and 4 wt % of Ce. A mesoporous $CeO_2$ shell of the prepared core-shell particle included mesoporous metal oxide with a pore size of about 2 nm to about 10 nm.

Example 2

1) Preparation of Core-Shell Particles

H-type ZSM-5 zeolite was added to deionized water in which glucose was dissolved and then, mixed therewith (Beaker A). Cerium nitrate III ($Ce(NO_3)_3$) was dissolved in deionized water in which urea was dissolved (Beaker B). The solution in the beaker B was added to the solution in the beaker A and mixed therewith. The final mixture was put in a Teflon (tetrafluoroethylene)-lined autoclave and reacted in a 160° C. oven for 20 hours. Subsequently, the resulting material was recovered, dried at 100° C. for 12 hours, and calcined at 550° C. for 12 hours under air flow of 200 mL/min to 300 mL/min by increasing the temperature at 1° C./min.

Herein, the core-shell particle included 4 wt % of Ce. A mesoporous $CeO_2$ shell of the prepared core-shell particle included mesoporous metal oxide with a pore size of about 2 nm to about 10 nm.

2) Metal Ion-Exchange Step

Cu was impregnated into the core-shell particle using a wet impregnation method. Specifically, copper nitrate trihydrate ($Cu(NO_3)_2 \cdot 3H_2O$, 98%, Sigma-Aldrich Co., Ltd.) was dissolved in deionized water to prepare a copper nitrate II ($Cu(NO_3)_2$) solution. The core-shell particle was added to the copper nitrate solution, and finally, 5 wt % of Cu was impregnated thereinto. The mixture was put in a rotary evaporator to all remove moisture therefrom and recover Cu-impregnated core-shell particles, and the Cu-impregnated core-shell particles were dried at 100° C. for 3 hours and calcined at 550° C. under air flow of 200 mL/min for 6 hours by increasing the temperature at 1° C./min.

Example 3

A hydrocarbon adsorbent was prepared according to the same method as Example 1 except that the cerium content was adjusted to 1 wt %.

Example 4

A hydrocarbon adsorbent was prepared according to the same method as Example 1 except that the cerium content was adjusted to 7 wt %.

Comparative Example 1

The Cu-impregnated zeolite core of Example 1 was used as a hydrocarbon adsorbent.

Comparative Example 2

A hydrocarbon adsorbent including $CeO_2$ as an additive was prepared using a method of physically mixing $CeO_2$. The Cerium content of the $CeO_2$ particle was adjusted to 4 wt % in the hydrocarbon adsorbent.

Comparative Example 3

A hydrocarbon adsorbent including a $CeO_2$ shell having no mesopores was prepared using a method of synthesizing the $CeO_2$ shell by using a precursor excluding glucose that makes mesopores. The Cerium content of the $CeO_2$ shell having no mesopores was adjusted to 4 wt % in the hydrocarbon adsorbent.

Figure 2:
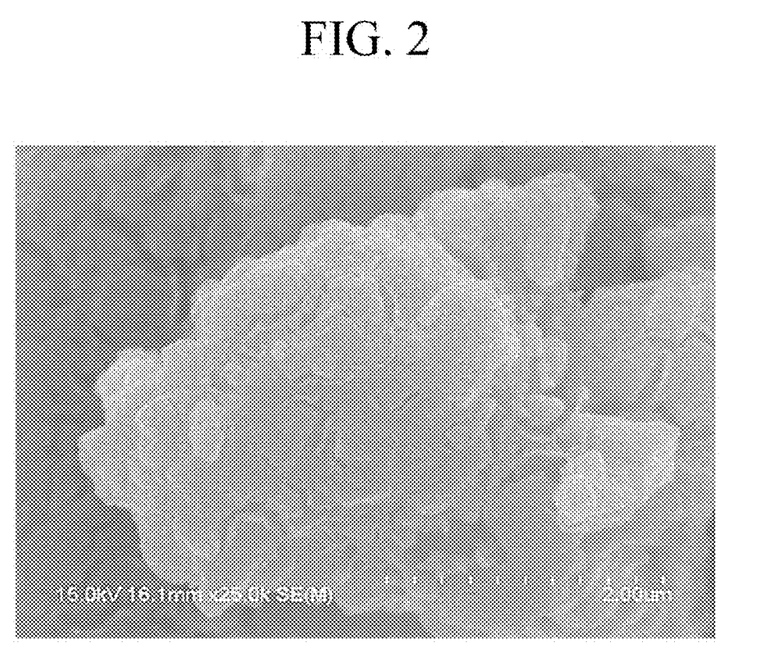
FIG. 2 is a photograph of the hydrocarbon adsorbent prepared in Example 1 observed with an electron microscope.

Experimental Example 1: Electron Microscopic Observation of Hydrocarbon Adsorbent The hydrocarbon adsorbent according to Example 1 was examined with an electron microscope, and the result is shown in FIG. 2. In addition, the H-type zeolite used in Example 1 was examined with an electron microscope, and the result is shown in FIG. 3.

Figure 3:
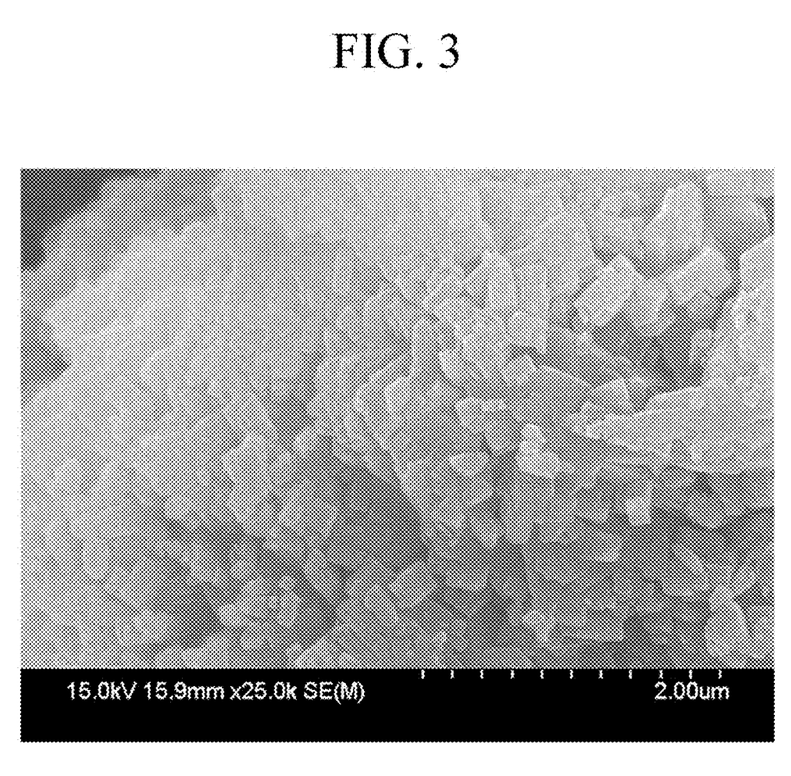
FIG. 3 is a photograph of the H-type zeolite used in Example 1 observed with an electron microscope.

Referring to FIGS. 2 and 3, the hydrocarbon adsorbent according to Example 1 had a core-shell structure that a ZSM-5 zeolite core was surrounded by a mesoporous $CeO_2$ shell.

Experimental Example 2: Evaluation of Adsorption Performance and Hydrothermal Stability of Hydrocarbon Adsorbent After charging 60 mg of a powder-shaped core-shell particle sample in a reaction pipe and pretreating it at 600° C. for 30 minutes under a flow of He, absorbing hydrocarbon at 70° C. for 5 minutes under a flow of $C_3H_6$, $C_7H_8$, CO, $H_2$, $O_2$, $CO_2$, $H_2O$, and a carrier gas of Ar/He mixed gas (under a condition of Lambda 1), and then raising the temperature to about 300° C. at a rate of about 53° C./min, hydrocarbon adsorption/desorption performances of the hydrocarbon adsorbents were evaluated.

Figure 4:
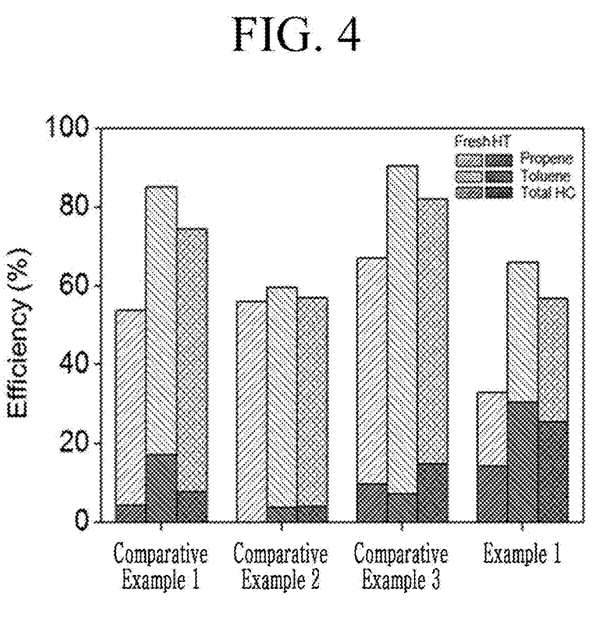
FIG. 4 is a graph showing adsorption/desorption evaluation results of hydrocarbon adsorbents prepared in Example 1 and Comparative Examples 1 to 3.

The adsorption/desorption evaluation results of the hydrocarbon adsorbents according to Example 1 and Comparative Examples 1 to 3 are shown in FIG. 4.

In FIG. 4, the Efficiency may be calculated by Equation 1

$$\text{Efficiency}(\%)=(1-Q_{out}/Q_{in})*100 \qquad \text{Equation 1:}$$

In Equation 1, $Q_{in}$ indicates an amount of hydrocarbon fed to the hydrocarbon adsorbent, and $Q_{out}$ indicates an amount of hydrocarbon discharged through the hydrocarbon adsorbent.

Equation 1 is to calculate an efficiency of the hydrocarbon adsorbent for adsorbing hydrocarbon, by feeding hydrocarbon to the hydrocarbon adsorbent for adsorbing hydrocarbon and measuring the fed amount of the hydrocarbon and the discharged amount of the hydrocarbon from the hydrocarbon adsorbent for adsorbing hydrocarbon and then, using a ratio of the fed hydrocarbon amount to hydrocarbon adsorbent for adsorbing hydrocarbon up to 300° C. and the discharged hydrocarbon amount through the hydrocarbon adsorbent for adsorbing hydrocarbon.

HT represents the result for the hydrothermal-treated hydrocarbon adsorbent, and Fresh represents the result for the fresh hydrocarbon adsorbent which is not hydrothermal-treated. The hydrothermal treatment of the hydrocarbon adsorbent may be, for example, performed with air including about 10 wt % of water at about 800° C. for about 24 hours. Total HC represents the result for total hydrocarbons including Propene and Toluene.

Referring to FIG. 4, when a shell of the core-shell particle included mesoporous $CeO_2$, the most excellent hydrothermal stability was obtained.

Figure 5:
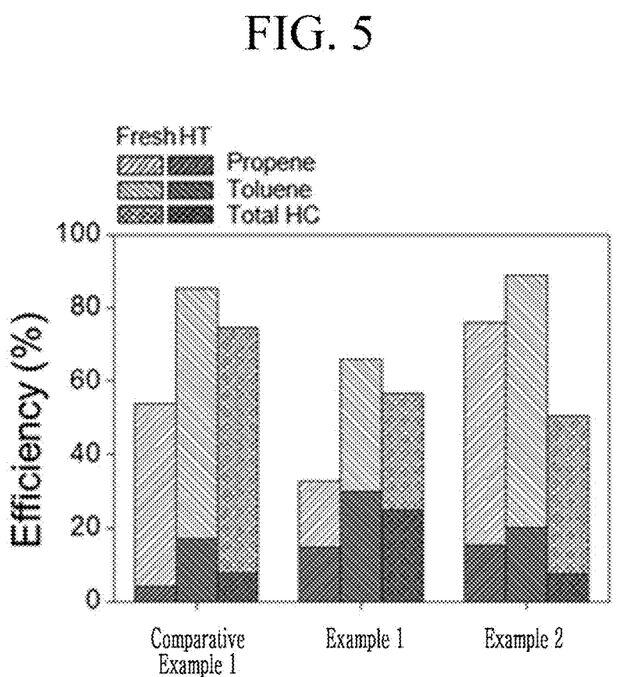
FIG. 5 is a graph showing adsorption/desorption evaluation results of hydrocarbon adsorbents prepared in Example 1, Example 2, and Comparative Example 1.

In addition, the adsorption/desorption evaluation results of the hydrocarbon adsorbents according to Examples 1 and 2 and Comparative Example 1 are shown in FIG. 5.

Referring to FIG. 5, when the zeolite was ion-exchanged with the metal before forming the shell, as shown in Example 1, the mesoporous metal oxide shell suppressed sintering of the metal ions and thus much improved hydrothermal stability of the hydrocarbon adsorbent.

Figure 6:
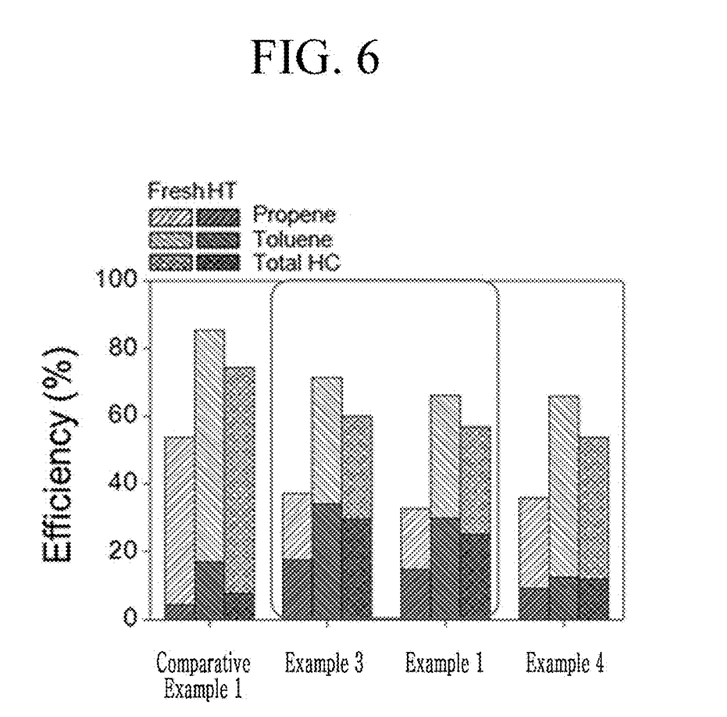
FIG. 6 is a graph showing adsorption/desorption evaluation results of hydrocarbon adsorbents prepared in Examples 1, 3, and 4, and Comparative Example 1.

In addition, the adsorption/desorption evaluation results of the hydrocarbon adsorbents according to Examples 1, 3, and 4 and Comparative Example 1 are shown in FIG. 6.

Referring to FIG. 6, when the metal of the mesoporous $CeO_2$ shell was 0.1 wt % to 4 wt %, hydrocarbon adsorption performance and hydrothermal stability became much more excellent.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope greater than or equal to appended claims.

The invention claimed is:

1. A hydrocarbon adsorbent, comprising:
   a core-shell particle including a core and a shell surrounding the core;
   wherein the core includes ion-exchanged zeolite that is ion-exchanged with a metal other than silicon (Si) and aluminum (Al); and
   wherein the shell consists of a metal oxide and has mesopores.

2. The hydrocarbon adsorbent of claim 1, wherein the zeolite has a Si/Al mole ratio of about 10 to about 200.

3. The hydrocarbon adsorbent of claim 1, wherein the zeolite is ion-exchanged with a metal including: Cr, Fe, Co, Ti, W, Ir, Pt, Rd, Pd, Ru, Th, Ni, Cu, V, Au, Re, Zr, Mo, or a combination thereof.

4. The hydrocarbon adsorbent of claim 1, wherein the mesopores have a pore size of about 2 nm to about 10 nm.

5. The hydrocarbon adsorbent of claim 1, wherein the metal oxide includes $CeO_2$, $ZrO_2$, $Al_2O_3$, or a combination thereof.

6. The hydrocarbon adsorbent of claim 1, wherein the metal of the metal oxide is included in an amount of about 0.1 wt % to about 7 wt % based on a total weight of the core-shell particle.

\* \* \* \* \*